April 27, 1965   R. P. CONGER ETAL   3,180,779
DECORATIVE SURFACE COVERINGS AND PROCESS FOR PRODUCING THEM
Filed Nov. 14, 1962   2 Sheets-Sheet 2

INVENTORS.
JUSTIN J. JECKER
ROBERT P. CONGER
BY
ATTORNEY

United States Patent Office 3,180,779
Patented Apr. 27, 1965

3,180,779
DECORATIVE SURFACE COVERINGS AND
PROCESS FOR PRODUCING THEM
Robert P. Conger, Park Ridge, and Justin J. Jecker, Newfoundland, N.J., assignors to Congoleum-Nairn Inc., Kearny, N.J., a corporation of New York
Filed Nov. 14, 1962, Ser. No. 237,549
20 Claims. (Cl. 161—6)

This invention relates to decorative surface coverings for floors, walls, ceilings, countertops, structural materials and the like and, in particular, to plastic coverings which have scintillating appearance of depth and to a method of producing such plastic surface coverings.

Plastic surface coverings comprising a resinous binder, stabilizer, filler and colored pigments have come to be widely used in various building materials, such as coverings for floors, walls and the like. These products have excellent wearing properties and resistance to attack by household chemicals. They have been prepared in a wide range of patterns and decorations simulating, for example, most of the effects which can be produced with stone materials, such as marble and terrazzo. In comparison to stone materials, they have the advantage of greater resilience which renders them more comfortable under foot. In addition, they do not flake and chip when subjected to sharp impacts which is an undesirable feature of stone materials.

Recently, plastic surface coverings having a translucent appearance have been produced in an attempt to create a surface covering having a dimensional effect. In the method now in use for producing such products, a batch of translucent plastic composition is formed and blended with separate batches of plastic composition pigmented in each of the colors desired in the finished product. This blend is then pressed or molded to produce the finished product. Plastic surface coverings so prepared have a number of significant disadvantages. Although the product appears to be translucent when held in the hand in front of a light, there is little, if any, three-dimensional effect when it is installed against a surface. An installation of such products merely resembles a modified form of a marbelized decoration which has been available for many years. In addition, portions of the undersurface are visible which necessitates careful selection and installation of the material.

Th use of embossing techniques have also been utilized for producing three-dimensional surface coverings. Such process usually involves the passing of a composition sheet through an embossing roll or molding the surface of the product against an embossed plate. Very desirable and varied effects can be obtained by this method. The product, however, defeats one of the main purposes of the plastic type of surface coverings in that it does not provide a smooth, readily cleanable surface. As is apparent, the embossed depressions collect dirt and are, therefore, difficult to maintain. Attempts have been made to cover the embossings with translucent layers so that such an embossed product has a smooth surface. Extreme care must be exercised in such an operation when applying any pressure to prevent the collapse of the embossings.

An object of the invention is to produce a decorative plastic surface covering having a three-dimensional appearance. Another object of the invention is to produce such a plastic surface covering having a smooth wearing surface. Another object of the invention is to produce a plastic surface covering having a three-dimensional appearance which has a scintillating appearance not subject to distortion by pressing. An additional object of the invention is to provide a plastic surface covering having a three-dimensional effect which can be installed without regard to the appearance of the sub-surface. Other objects and the advantages of the invention will appear from the following detailed description.

In accordance with the invention, a decorative plastic surface covering having a three-dimensional appearance is produced by laminating one surface of a thin metal foil to a sheet of substantial thickness, embossing or otherwise depressing areas of the thin metal foil to a depth greater than the thickness of the foil and then laminating the opposite surface of the embossed foil to a second sheet of substantial thickness. At least one of the sheets must be transparent or at least partially transparent so that the embossed foil is visible from the surface of the product. The resulting product has a smooth surface while possessing a three-dimensional appearance created by the appearance of the embossing through the depth of the film. The use of the foil fixes the embossings and allows the product to be subjected to the heat and pressure of processing without losing the embossing. The foil can also serve as a reflective surface giving the product a scintillating effect. In addition, various designs can be printed on the foil and/or wear layer to give the product added variation in design. If the wear layer is a transparent film, a decoration can be printed on the film which is laminated to the foil. As an alternative the sheet then produced with or without a base can be cut into regular or irregular chips and used for decorative application such as in the processes disclosed in U.S. Patent 2,888,975, dated June 2, 1959, to W. E. Benedict, and U.S. Patent 2,962,081, dated November 29, 1960, to J. F. Dobry et al.

The invention can be better understood from the following detailed description when read in conjunction with the drawings wherein:

FIGURE 4 is a plan view of the finished product shown in FIGURE 3.

Figure 1:
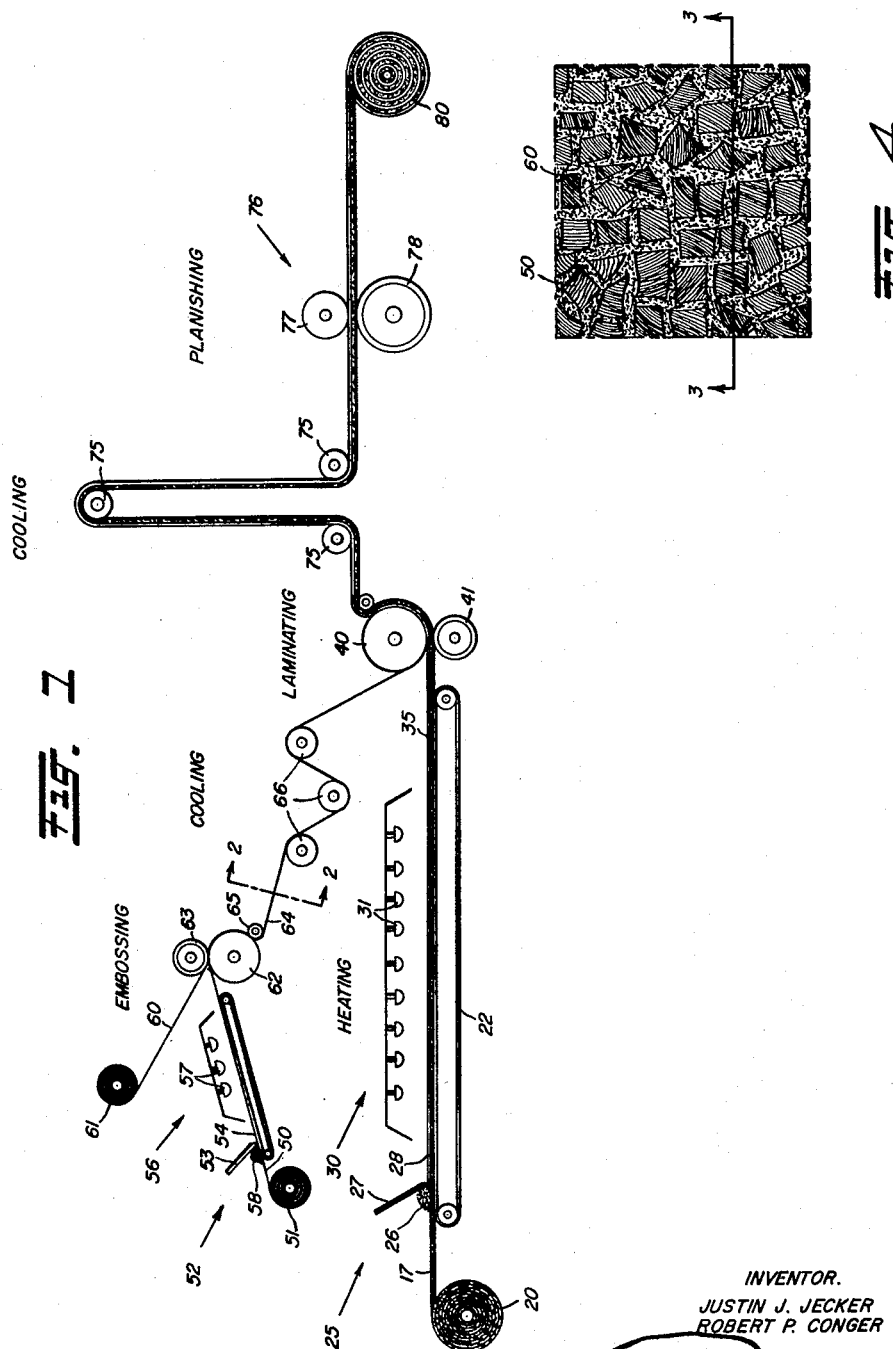
FIGURE 1 is a schematic representation of one method for producing the three-dimensional decorative surface covering of the invention.
Figure 2:
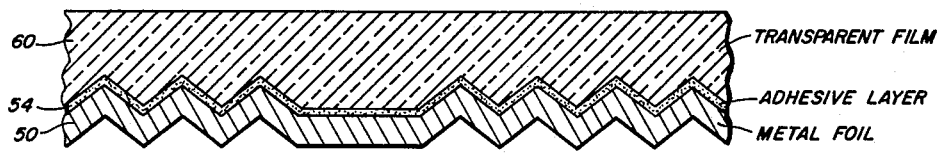
FIGURE 2 is a cross-sectional view of the embossed foil laminated to a transparent film.
Figure 3:
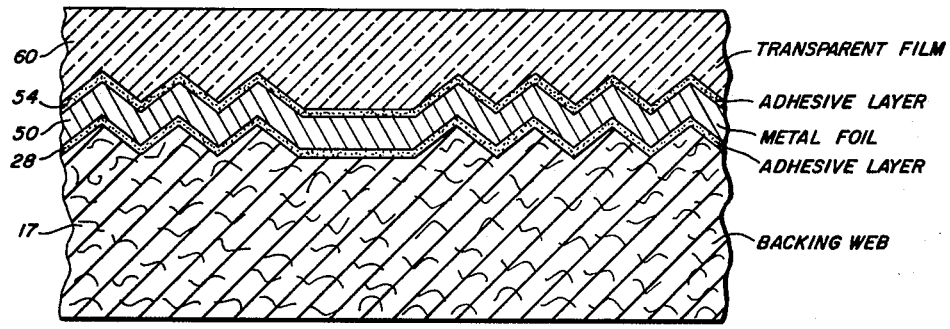
FIGURE 3 is a cross-sectional view of one form of the final product.

With reference to FIGURE 1, a backing web, such as a felt sheet 17 is fed from a supply roll 20 onto a continuous conveyor 22 which conveys the web through a coating apparatus generally indicated at 25. The coating apparatus applies a thin layer of adhesive over the surface of the web. The coating apparatus can be any type of coater, such as a reverse roll coater or simply a doctor blade 27 which controls the amount of adhesive 28 which is placed on the web from a reservoir 26 of the adhesive held back of the blade 27. The adhesive-coated web is then passed through a heating oven generally indicated at 30 which can have any type of heat source such as a bank of infrared heating lamps 31. The oven heat causes the evaporation of any solvent in the adhesive and tackifies the adhesive. The coated web is then fed to the laminating step. The laminator can comprise a steel roll 40 and a steel back-up roll 41 having a resilient cover, such as rubber.

A metal foil 50 is fed from supply roll 51 and passes through a coating apparatus generally indicated at 52 for applying an adhesive to the surface of the foil. The coating apparatus can be similar to the apparatus used for coating the web described above, such as a doctor blade 53 which places a thin coat 54 of adhesive on one surface of the foil from a reservoir of adhesive 58 held in back of the doctor blade 53. The adhesive coated foil is then passed through a heating oven generally indicated at 55 which can be a series of infra-red heat lamps 57 which evaporate any solvent and activate the adhesive. A transparent film 60 is fed from a roll 61 so that one surface contacts the activated adhesive coated foil. The two sheets are fed to an embossing apparatus comprising an engraved roll 62 and a resilient covered back-up roll 63. The two sheets are laminated together in the embosser and the laminated sheet embossed from the foil side of the laminate. The laminate 64 is allowed to cool in contact with the embossing roll to set the embossings and adhesive and is then stripped off by a take-off roll 65. The laminated embossed film can be further cooled by passing over cooling rolls 66 if desired.

The embossed laminate 64 is then placed on top of the adhesive coated web 35 and immediately passed through a laminator. The laminating drum 40 is preferably maintained at a temperature as low as possible to prevent any undue heating of the film. The laminated product is allowed to travel on the surface of the drum 40 thereby dissipating as much as possible the heat from the web and to allow the adhesive to set. The product is then passed over cooling rolls 75. The laminated product can be fed to a planisher generally indicated at 76 if it is desired to place a higher gloss on the surface of the product. The planisher comprises a hard surface roll 77 and a resilient covered back-up roll 78. The laminated product is then wound on a collecting drum 80. The laminate can be used directly on a floor, wall or other surface like covering or secured to the surface of a structural material for example a plywood sheet.

The sheet which forms the backing or under-surface of the product of the invention is preferably a strong felt sheet. Strength is important in order that the product withstand the strains occurring both during manufacture and installation of the product. In the case of a flexible resilient product useful as a floor covering, the backing should also have sufficient flexibility to permit the product to be rolled and unrolled without cracking or tearing. Suitable backing sheets, however, can also include those formed of resinous compositions. Any of the thermoplastic or elastomeric resinous compositions which can be calendered or pressed to form a flexible sheet can be used to form a backing web for use in the invention. Such resins as butadiene-styrene copolymer, polymerized chloroprene, polyvinyl chloride, polyvinyl acetate, vinyl chloride-vinyl acetate copolymers and the like can be compounded with plasticizers and fillers and sheeted to form a flexible sheet. In some cases, scrap and degraded resinous compositions can be salvaged by forming them into sheets which are useful as backing sheets in producing products in accordance with the invention.

Suitable backing sheets also include woven fabrics such as burlap and those formed from cotton, wool and various synthetic fibers. It has been found that felted cellulosic or asbestos fibrous sheets impregnated with a water-proofing and/or strengthening impregnant are highly desirable backings for products prepared in accordance with the invention since they are low in cost and yet are flexible and strong. Numerous fibrous materials can be used in preparing a fibrous backing for use in the invention. A slurry of fibrous material in water can be formed into a sheet using any of the techniques conventionally employed in the manufacture of paper. For example, sheet formation can take place on a Fourdrinier or cylinder paper machine. The fibrous sheet so prepared is then dried to remove the water.

As indicated above, felted fibrous sheets when used for backings are normally impregnated with a water-proofing and/or strengthening impregnant in order to impart improved strength and water resistance to the sheet. The particular impregnant must not only be able to impart strength and water resistance to the sheet of felted fibers, but must also have certain desirable high temperature properties to allow them to be subjected to the processing temperatures required. The impregnant should be free of any volatile components and also it must not soften to such an extent as to exude from the sheet. In addition, the impregnant should no be subject to any detrimental chemical change, such as oxidation, at these processing temperatures.

Suitable impregnants include vinyl resins, such as polyvinyl chloride, polyvinyl acetate, polymerized vinylidene chloride, mixtures of these with each other, copolymers with each other and with other monomers copolymerizable therewith, polymerized acrylic and metha-acrylic acids and their polymerized derivatives, polyethylene, polystyrene, butadiene-styrene copolymer, butadiene-acrylonitrile copolymer, natural rubber, polymerized chloroprene and the like. Thermosetting resins which under the influence of heat cure by polymerizing and cross-linking can also be used as impregnants. Such resins as phenolic resins, polyesters, drying oils and the like, isocyanates and polyurethanes and the like are suitable.

The impregnants can be incorporated into the felted fibrous sheet by passing the web through an emulsion or solution of the resin followed by drying of the sheet to remove the solvent. Alternately, the resin can be added in fine particles to the fiber furnish prior to sheet formation either as solid particles of resin or as an emulsion in water from which fine particles of resin are precipitated onto the fibers.

The wear layer of the product of the invention can be a transparent, partially transparent, translucent or printed film or coating. Alternately the wear layer can be molded on top of the embossed sheet by distributing resinous composition chips on its surface followed by the application of heat and pressure to mold the chip into a sheet. The film or coating comprises a resinous binder and stabilizer and, in some instances, fillers. Various amounts of pigments or dye can be used to give the wear layer different degrees of translucence.

The resinous binder used in the wear layer composition must be one that can be coalesced, fused or cured into a continuous film by the application of heat. The resinous binder in the coating composition must be compatible with the laminating adhesive. The invention is adapted to the preparation of both flexible and rigid decorative sheets, but a flexible product is most desirable for use as a resilient surface covering for floors. The preferred resinous binder in the coating or film composition comprises thermoplastic resinous material since thermoplastic resins are particularly suited to the production of flexible resilient sheets. The thermoplastic resinous binder can be made up solely of thermoplastic resinous material, but it normally comprises a mixture of a thermoplastic resin and one or more plasticizers.

Useful thermoplastic resins include polymers and copolymers of acrylic and methacrylic acids and their derivatives, the vinyl resins, polystyrene, polymerized methylstyrene, polybutadiene and the like. Polymers of vinyl chloride have been found particularly effective in the formulation of compositions in the invention. The vinyl chloride polymers can either be simple, unmixed homopolymers of vinyl chloride or copolymers thereof in which the essential polymeric structure of polyvinyl chloride is interspersed at intervals with the residues of other ethylenically unsaturated compounds copolymerized therewith. The essential properties of the polymeric structure of polyvinyl chloride will be retained if not more than 40 percent of another monomer is copolymerized therein. Suitable monomers include, for instance, vinyl esters on the order of vinyl bromide, vinyl fluoride, vinyl acetate, vinyl chloroacetate, vinyl butyrate, other fatty acid vinyl esters, vinyl alkyl sulfonates, trichloroethylene and the like; vinyl ethers such as vinyl ethyl ether, vinyl isopropyl ether, vinyl chloroethyl ether and the like; cyclic unsaturated compounds such as styrene, the mono- and polychlorostyrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethyl maleate, diethyl fumarate and the like; vinylidene compounds on the order of vinylidene chloride, vinylidene bromide, vinylidene fluorochloride and the like; unsaturated hydrocarbons such as ethylene, propylene, alkyl chloride, allyl ethyl ether and the like; and conjugated and cross-conjugated ethylenically unsaturated compounds such as butadiene, isoprene, chloroprene, 2,3-dimethylbutadiene-1,3 piperylene, divinyl ketone and the like.

As already discussed, resinous material can be produced which has satisfactory flexibility at normal temperatures without the presence of plasticizers to be useful as the resinous binder in the coating composition. However, in the case of most of the preferred vinyl chloride polymers, the presence of plasticizer is desirable. Useful plasticizers are esters of straight and branched chain alcohols with aliphatic acids, esters of aliphatic alcohols and aromatic acids, esters of aromatic alcohols and aliphatic acids, esters of aromatic alcohols and aromatic acids, organic esters of inorganic acids, high molecular weight hydrocarbon condensates and the like. Typical plasticizers of these types include dibutyl sebacate, dioctyl sebacate, dioctyl adipate, dioctyl azelate, triethylene glycol di-(2-ethylhexanoate), diethylene glycol dipelargonate, dibutyl phthalate, dioctyl phthalate, dibutoxy ethyl phthalate, dipropylene glycol dibenzoate, butyl benzyl phthalate, dibenzyl sebacate, dibenzyl phthalate, tricresyl phosphate, octyl diphenyl phosphate, chlorinated paraffine, alkyd derivatives of rosin and the like. The blend of resin and plasticizer is normally formed within the limits of 15 to 150 parts of plasticizer per 100 parts of resin.

Elastomeric resins such as butadiene-styrene copolymer, butadiene-acrylonitrile copolymer, polymerized chloroprene, natural rubber and the like can also be used as resinous binders in the formulation of coatings for use in the invention. Thermosetting resins can also be used as resinous binders in the coating composition, such as urea-formaldehyde resins, melamine resins, polyesters, polyurethanes, and the like.

The wear layer composition can contain fillers and pigments in accordance with the particular design effect desired in the finished product. Inert fillers, such as silica, both amorphous and crystalline, whiting, talc, clay, pumice, limestone and the like are suitable. Pigments are selected in accordance with the desired color. For example, where white is desired, titanium dioxide and zinc oxide either alone or with extenders, such as barium sulfate, calcium sulfate, magnesium carbonate, magnesium silicate and the like can be used. For other colors, any of the well-known organic and inorganic pigments can be used.

If the wear layer is a coating it can be applied as an emulsion, plastisol or organosol composition. The dispersion medium is a plasticizer for the resinous binder in the case of a plastisol and a mixture of plasticizer and volatile organic solvent in the case of an organosol.

The wear layer composition usually also contains stabilizers to minimize degradation by light and heat. Suitable light stabilizers include resorcinol disalicylate, resorcinol dibenzoate, phenyl phthalate, phenyl benzoate, o-tolyl benzoate, eugenol, guaiacol, o-nitrophenol, o-nitraniline, triethylene glycol, salicylate, and organic phosphates and other complexes of such metals as barium, cadmium, strontium, lead, tin and the like. Suitable heat stabilizers include sulfides and sulfites of aluminum, silver, calcium, cadmium, magnesium, cerium, sodium, strontium, and the like, glycerine, leucine, alanine, o- and p-amino benzoic and sulfanilic acids, hexamethylene tetramine, weak acid radicals including oleates, recinoleates, abietates, salicylates and the like. Normally, the composition contains from 0.5 to 5 parts stabilizer per 100 parts resin.

When using the technique of coating to apply a wear layer, the resinous composition is applied to the composite backing containing the embossed foil by any of the conventional techniques well-known in the coating art, such as roll coating, doctor blade coating, spray application, brush application and the like. After the coating has been applied, the sheet must be subjected to heat in order to evaporate any volatile components and to set the resinous binder into a flexible uniform film. The temperature which the coated layer must attain is dependent on the particular resinous binder used. With the preferred thermoplastic resinous binders, the coating is preferably heated to the fusion temperature of the resin, that is the temperature at which the resin becomes solvated by plasticizer to yield a smooth flexible tough film. Where the thermoplastic resinous binder contains no plasticizer, the coating is heated to a temperature sufficient to soften the resin, thereby causing the minute particles present in the emulsion to coalesce and form a uniform film. Heating to a temperature within the range of about 250° to about 375° F. is usually sufficient to yield a uniform film. Heating can be effected by any of the conventionally used methods, such as passing the sheet through a forced hot air oven or radiant heating elements can be placed above the coated surface.

If a film is utilized, or resinous composition chips molded to the surface they can also contain small amounts of a release additive in order that the product can be more easily removed from the laminating or moulding surface. Suitable release additives are waxy substances of both synthetic and natural origin with the vegetable waxes, such as carnauba wax, being particularly effective. Where a release additive is used, the composition normally will contain from about 0.2 to about 5 parts of release additives per 100 parts resin. The compositions also contain stabilizers to minimize degradation by light and heat, such as disclosed above in the description of the coating composition.

The film or resinous composition chips can be formed by any of the conventional methods of film formation. Normally, the various components of the film are mixed in a suitable mixer such as a Banbury at a temperature which causes the resinous component to become soft thereby forming a homogeneous mixture. This temperature varies with the particular resinous component but is usually between about 250° and about 375° F. The composition is then sheeted by passing through a series of calender rolls. The calender rolls are normally heated at a temperature of from about 25° to 100° F. below the mixing temperature. The sheet is thereafter cooled and wound on a collecting roll. The sheet can be broken up into any size chip if desired.

The thickness of the wear layer is not critical to the invention, although it is necessary for the layer to have sufficient thickness to give the product a reasonable wear life, dependent on its ultimate use. A minimum wear thickness for flooring would be at least about 0.003 inch and preferably about 0.006 inch. As a general rule, the wear layer is not over 0.250 inch in thickness.

The thin metal foil is preferably aluminum foil because of its relatively low cost and excellent reflective surface. Other metal foils can be used, however, such as copper, tin and the like. The thickness of the foil is critical to the invention. It has been discovered that the thickness of the foil must be less than 0.005 inch, with the range of about 0.002 to about 0.0005 inch being preferred. In accordance with the invention, it is essential for the foil, prior to embossing, to be laminated to a sheet which can either be the base, an intermediate layer, or the exposed layer of the finished product. This is essential for the foil to retain its embossed design in good fidelity during the subsequent operations. This retention of the design is only possible, however, when the embossing extends in depth greater than the thickness of the foil. This results in the substrate also having at least its surface embossed thereby fixing or giving added strength to the embossing to resist flattening during the subsequent processing. The embossing can be accomplished by any of the conventional methods which usually involve subjecting the sheet to high pressure of the order of 500 to 1,000 pounds per square inch. The embossing apparatus usually comprises a steel embossing roll engraved with the desired design to be embossed and a resilient covered back-up roll which forces the sheet against the embossing roll. If the foil is laminated to the sheet in the embossing operation it is normally allowed to be carried on the embossing roll so that the laminating adhesive has an opportunity to set and bind the sheet together. The laminate can then be further cooled by passing over cooling drums and wound on a collecting drum.

The embossings must be of sufficient depth so that in the final product, they will give the product a three-dimensional appearance. As a general rule, the embossings must have a depth of at least 0.001 inch. The embossings can take any design depending on the apparance desired in the final product. A particularly effective product is obtained by embossing a pattern in grooves representing a fresnel-type lenticular pattern wherein the grooves are progressive in depth and each ridge has one side perpendicular to the plane of the sheet and the other side at an angle thereto. With an embossed pattern such as this, there is produced a gradient in light reflected from the material. Such an embossing technique is disclosed in U.S. Patents 2,875,543 and 2,958,148, issued to Sylvester et al. The reflective foil is responsible for the scintillating effect obtained in the product. Usually decorative effects are obtained when a design in one or more colors is printed on the foil prior to embossing. A wide range of effects can be obtained if the rotogravure technique of printing is used wherein fine dots of color are applied to the surface of the film in the form of circles, squares, triangles and the like as is conventional in rotogravure printing. If the dots of color are correlated with the size, width and depth of the embossing it is possible to obtain striking color effects. Particularly good results are obtained by printing a design with about 50 to 120 lines per inch and a lenticular embossing having grooves spaced from 1/30 to 1/100 of an inch apart and a depth varying from .001 to .005 inch.

The foil can be laminated to the sheet which forms the backing or wear layer by a variety of methods. An adhesive can be applied to either or both surfaces. Suitable adhesives are those which are compatible with both the film and the backing. A particularly suitable adhesive is a composition comprising a vinyl chloride, vinyl acetate copolymer which is modified by the presence of carboxyl groups, suitably introduced by combining maleic anhydride into the reactants during polymerization. The adhesive further preferably contains a polymerized alkyl acrylate or methacrylate. Other modifying agents which can be included in the adhesive to impart specific properties include chlorinated biphenyl resins, nitrite rubbers, partially hydroylzed vinyl chloride-vinyl acetate copolymers, or modified alkyl resins, pigments and fillers such as mica, silica and talc. An adhesive layer of 0.002 inch in thickness has proven particularly effective, although the thickness of the adhesive is not critical. The adhesive layer should be continuous. It is helpful in some instances to maintain the high fidelity of the embossed design by utilizing an adhesive which fills in the embossing. If the product is to be further subjected to heat treatment, a thermosetting adhesive composition is particularly desirable. In place of a thermosetting adhesive, a thermoplastic adhesive of high softening point can be used.

The composite film and foil laminate can be secured to the wear layer or base in a manner similar to forming the foil laminate. The pressure supplied in the laminating step, however, is of particularly critical importance. If the pressure is too great, it can cause loss of the embossings thereby destroying or substantially eliminating the desired optical effect. As a general rule, the maximum pressure should not exceed about 40 pounds per inch of sheet width which is calculated by dividing the total pressure between the laminating rolls by the width of the sheet. The pressure utilized is preferably between about 5 to about 20 pounds per inch of sheet width.

The following examples are given for purposes of illustration:

EXAMPLE 1

The following composition was mixed in a Banbury mixer at a temperature of 350° F.:

| | Parts |
|---|---|
| Polyvinyl chloride (35,000 average molecular weight) | 100 |
| Dioctyl phthalate | 33 |
| Barium-cadmium laurate | 2 |
| Epoxidized soya oil | 2 |
| Carnauba wax | 0.4 |

The mixed composition while hot was sheeted between calender rolls heated to a temperature of about 250° F. to yield a clear, transparent sheet of approximately 0.008 inch in thickness. The sheet was then heated to about 325° F. and passed through a lamination apparatus simultaneously with an aluminum foil of 0.001 inch in thickness. The aluminum foil had been coated on one surface with an 0.005 inch thick layer of adhesive having the following composition:

*Adhesive I*

| | Parts |
|---|---|
| Copolymer of vinyl chloride (87%) and vinyl acetate (12%) containing maleic anhydride (1%), molecular weight 10,000–15,000 | 11.3 |
| Polybutyl methacrylate | 13.1 |
| Polyisobutyl methacrylate | 5.6 |
| Butyl acetate | 21 |
| Methyl isobutyl ketone | 21 |
| Toluol | 14 |
| Propylene oxide | 3.5 |
| Ethyl acetate | 13.7 |

The laminated sheet is then passed to an embossing roll maintained at a temperature of about 325° F., which embossed an overall design into the foil side of the laminate to a depth varying from about 0.001 to about 0.002 inch. The embossed design on a lenticular configuration formed of a series of spaced, irregularly-shaped elements wherein each element resembles a fresnel lens and contains a series of sharply peaked ridges which in cross-section are formed with the sides of the ridges steeper on one side than on the other, and with the grooves varying progressively in depth along the cross-section with respect to the angles at the peaks of the successive ridges and with the slopes of the sides of the ridges with the largest peak angles located at the ridges adjoining the shallowest grooves. The grooves were about 0.02 inch apart. The sheet was thereafter cooled to room temperature by passing over cooling rolls.

A cellulosic felt sheet of approximately 0.046 inch in thickness, impregnated with about 10% of polyvinyl acetate and about 30% of a petroleum resin having a softening point of 125° F. is coated on one surface with an adhesive having the following composition:

*Adhesive II*

| | Parts |
|---|---|
| Vinyl chloride-vinly acetate (87/12) copolymer modified with 1% maleic anhydride | 10 |
| Acrylonitrile-butadiene rubbery copolymer (35/65) | 10 |
| Methyl ethyl ketone | 60 |
| Methyl isobutyl ketone | 20 |

The coated felt was passed beneath a series of infra-red heat lamps to raise the temperature of the coating to 400° F. The felt was then passed through cold laminating rolls (60° F.) simultaneously with the embossed laminate, with the embossed side of the laminate contacting the adhesive coating. The laminate product is allowed to remain on contact with one of the laminating rolls to allow the product to cool. The laminate is then further cooled by passing over cooling rolls and then wound on a collecting roll.

The film layer of the product is integrally bonded to the felt with excellent resistance to delamination. The embossed areas of the film have retained their sharp definition. The embossing as viewed through the film gives an appearance of depth to the product and a very high light reflection caused by the presence of the aluminum foil. The product overall had a scintillating appearance.

EXAMPLE 2

An asbestos felt sheet, impregnated with about 10% of a rubbery copolymer of butadiene-acrylonitrile was coated with an 0.0005 inch thick layer of an adhesive having the composition:

| | Parts by weight |
|---|---|
| Vinyl chloride and vinyl acetate copolymer having free hydroxyl groups (VAGH, manufactured by Union Carbide Chemicals Co., New York, N.Y.) | 10 |
| Tricresyl phosphate | 5 |
| Methylethyl ketone | 8 |

The adhesive coated sheet was then heated to 350° F. to activate the adhesive and the sheet laminated to an aluminum foil having a thickness of about 0.001 inch. The laminated product was then passed to a rotogravure printing apparatus which prints an overall two-color design on the foil utilizing cylinders engraved with a 60 line screen. The printed foil was then fed to an embossing apparatus which placed in the aluminum foil an embossed design similar to that described in Example 1. The depth of the embossing range from about 0.001 to about 0.003 inch. The following composition was then coated on the embossed side of the laminate to a depth of 0.015 inch by the application of these successive coats:

| | Parts |
|---|---|
| Vinyl chloride polymer | 80 |
| Dioctyl phthalate | 13 |
| Tricresyl phosphate | 7 |
| Polyester plasticizer | 7 |
| Stabilizer | 4 |
| Mineral spirits | 17 |
| Methyl ethyl ketone | 2 |

The coated sheet was heated to 390° F. for a period of two minutes to fuse the coating passed through a planisher heated at 250° F. to smooth the surface and thereafter cooled. In the finished product, the embossed design was not lost and remained sharp in detail and the printed design was visible through the coating and because of the embossing had varying color effects when viewed from different angles. This is caused by the embossing breaking up the dot sequence of the printed design. The product also had a highly scintillating appearance.

Any departure from the above description which conforms to the present invention is intended to be included within the scope of the claims.

What is claimed is:

1. A decorative surface covering having a three-dimensional appearance and a resinous composition wear layer comprising a base, a thin metal foil securely bonded to one surface of said base, an embossed design in the surface of said foil extending to a depth greater than the thickness of said foil and into said base and a wear layer of resinous composition secured to the opposite surface of said foil, said wear layer being sufficiently transparent to have said embossed design visible through the upper surface of said layer.

2. The decorative surface covering of claim 1 wherein said foil is an aluminum sheet having a reflective surface.

3. The decorative surface covering of claim 1 wherein said embossed design is a lenticular design.

4. The decorative surface covering of claim 3 wherein said foil has a design printed on its visible surface comprising a series of spaced colored dots of about 50 to about 120 dots per linear inch.

5. The decorative surface covering of claim 1 wherein said base is a felted fibrous sheet and said wear layer is a vinyl resinous composition.

6. The decorative surface covering of claim 5 wherein said vinyl resinous composition comprises a polymer of vinyl chloride.

7. The decorative surface covering of claim 5 wherein said base and said film are secured to opposite surfaces of said foil with an adhesive.

8. The decorative surface covering of claim 5 wherein said thin metal foil has a reflective surface.

9. A method of producing a surface covering having a resinous composition wear layer which comprises laminating one surface of a thin metal foil sheet to one surface of a flexible sheet with an adhesive interlayer, embossing a design into the opposite surface of said foil sheet to a depth greater than the total thickness of said foil and adhesive layer and applying a second sheet to the opposite surface of the embossed foil sheet to completely cover said foil sheet, one of said sheets forming the wear layer and being formed of a transparent resinous composition.

10. The process of claim 9 wherein said embossed design is a lenticular design.

11. The process of claim 9 wherein said metal foil is an aluminum foil having a thickness of less than 0.005 inch.

12. The process of claim 10 wherein a design is printed on the exposed surface of said foil sheet prior to said embossing, said design comprising a series of spaced colored dots of about 50 to about 120 dots per linear inch.

13. A method of producing a surface covering having a resinous composition wear layer which comprises laminating a transparent film of thermoplastic vinyl resinous composition to one surface of a thin metal foil sheet with an adhesive interlayer, embossing a design in the opposite surface of said foil sheet to a depth greater than the total thickness of the foil sheet and the adhesive interlayer and laminating said opposite surface of said foil sheet to an opaque back sheet.

14. The process of claim 13 wherein said opaque back sheet is a fibrous felt sheet.

15. The process of claim 13 wherein said thermoplastic resinous composition comprises a polymer of vinyl chloride.

16. A method of producing a surface covering having a vinyl resinous composition wear layer which comprises laminating one surface of a thin aluminum foil sheet to an opaque back sheet with an adhesive interlayer, embossing a design in the opposite surface of said foil sheet to a depth greater than the total thickness of said foil sheet and adhesive interlayer, and applying a transparent layer of thermoplastic vinyl resinous composition over said opposite surface of said foil.

17. The method of claim 16 wherein said thermoplastic layer is a preformed film.

18. The method of claim 16 wherein said thermoplastic layer is formed by applying a coating of resinous composition and heating to fuse the coating composition after application.

19. The method of claim 16 wherein said embossed design is a lenticular design.

20. The method of claim 19 wherein a design is printed on the exposed surface of said foil sheet prior to said embossing, said design comprising a series of spaced colored dots of about 50 to about 120 dots per linear inch.

(References on following page)

References Cited by the Examiner

UNITED STATES PATENTS

| | | |
|---|---|---|
| 1,990,173 | 2/35 | Finley. |
| 2,205,466 | 6/40 | Caprio et al. |
| 2,392,594 | 1/46 | Karfiol et al. |
| 2,404,073 | 7/46 | Karfiol et al. _____ 156—209 |
| 2,617,750 | 11/52 | Le Clair et al. _____ 154—49 XR |
| 2,961,029 | 11/60 | Rainar _____ 154—49 XR |
| 3,000,754 | 9/61 | Zentmyer _____ 252—6 |
| 3,056,224 | 10/62 | Almy et al. _____ 154—49 XR |

EARL M. BERGERT, *Primary Examiner.*